July 28, 1970  J. L. JONES ET AL  3,522,367
OPTICAL INFORMATION DISPLAY SYSTEM
Filed March 10, 1967  5 Sheets-Sheet 1
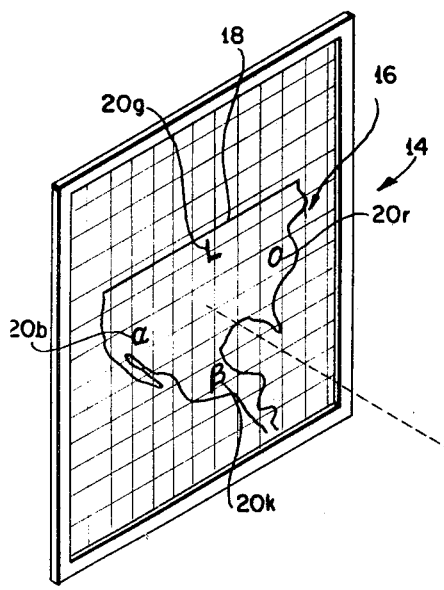
FIG. 1
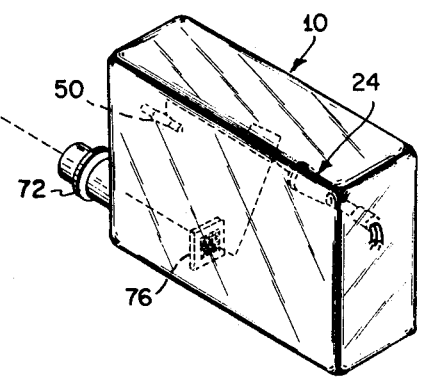
FIG. 3
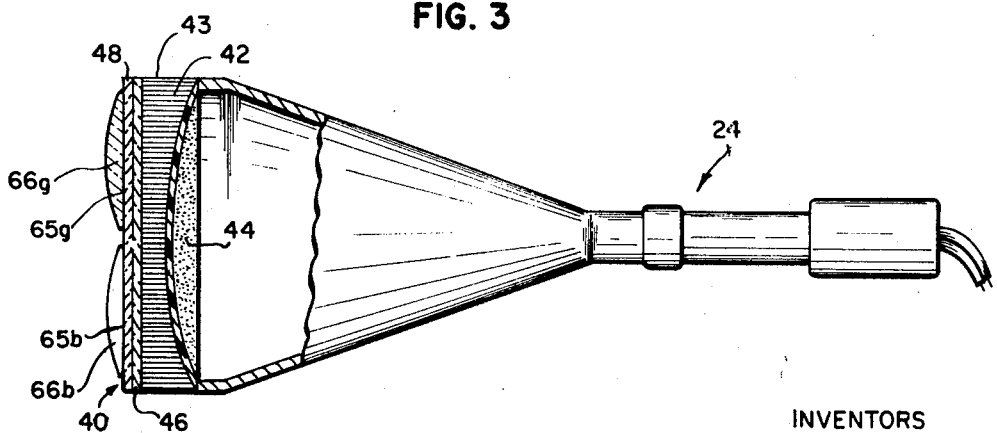
INVENTORS
JOHN L. JONES
ROBERT J. CIRILLO
BY *Louis A. Kline*
*John T. Matlago*
*Robert L. Harrington*
THEIR ATTORNEYS

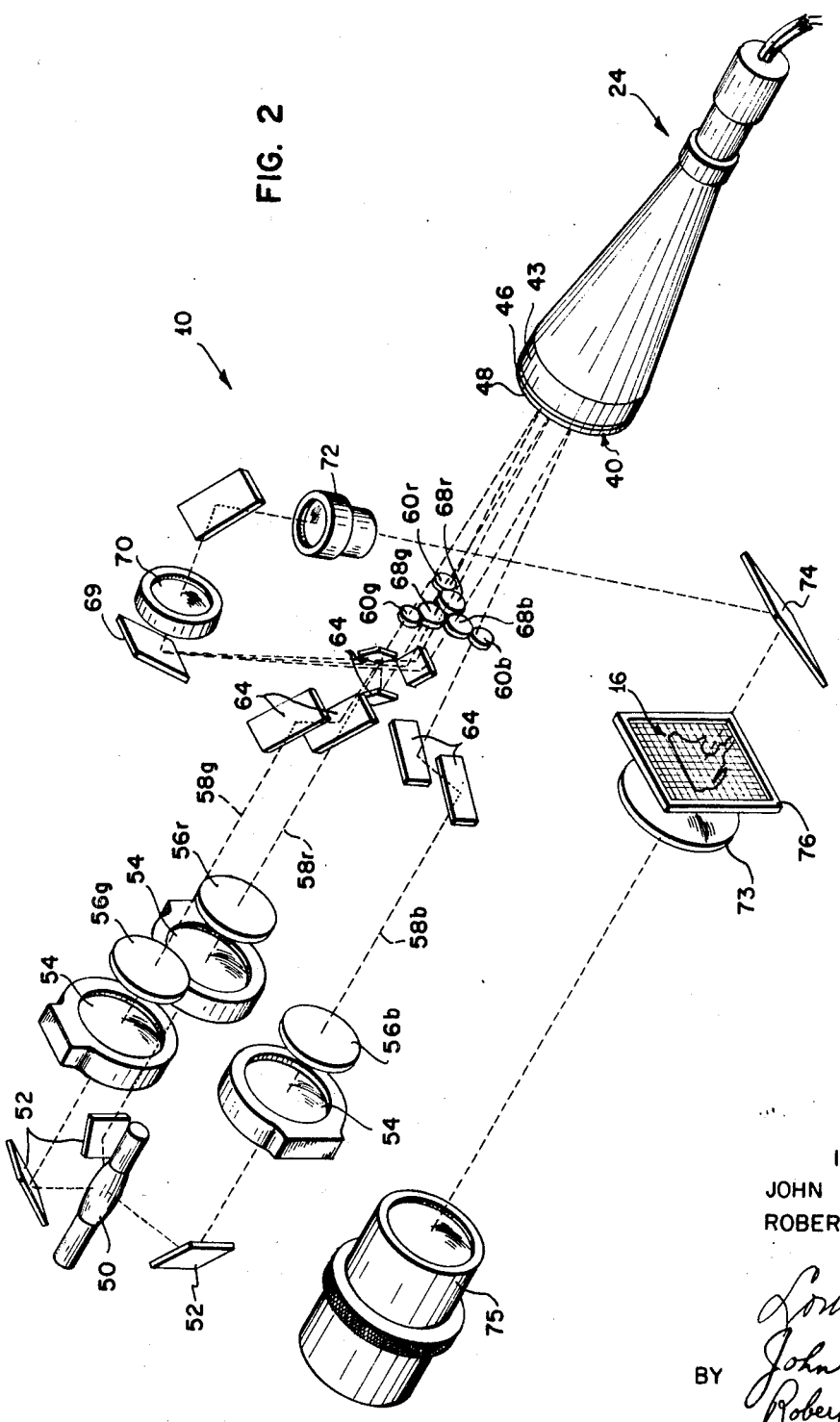

INVENTORS
JOHN L. JONES
ROBERT J. CIRILLO

INVENTORS
JOHN L. JONES
ROBERT J. CIRILLO
BY
THEIR ATTORNEYS

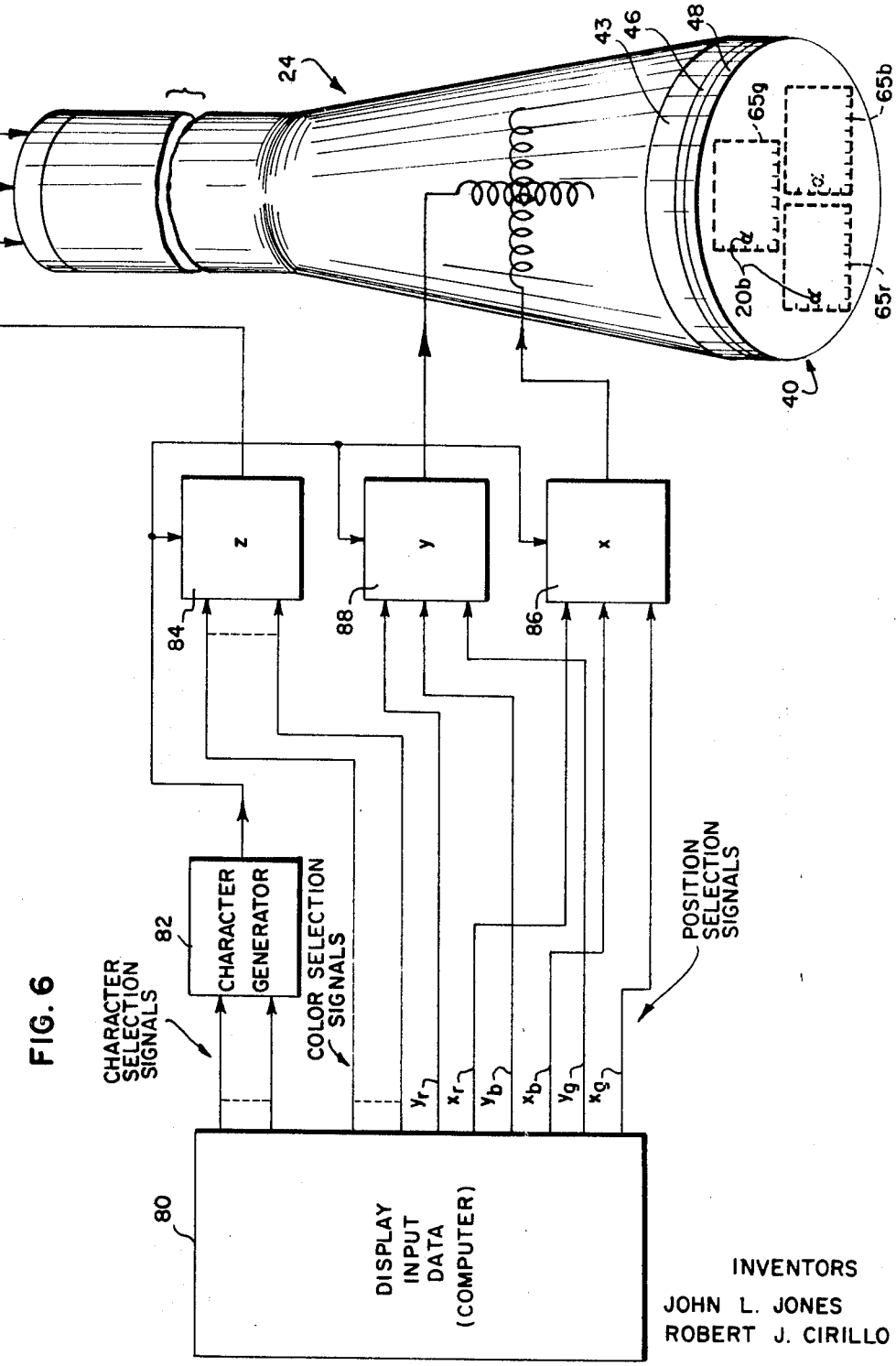

United States Patent Office 3,522,367
Patented July 28, 1970

3,522,367
OPTICAL INFORMATION DISPLAY SYSTEM
John L. Jones, Gardena, and Robert J. Cirillo, Manhattan Beach, Calif., assignors to The National Cash Register Company, Dayton, Ohio, a corporation of Maryland
Filed Mar. 10, 1967, Ser. No. 622,203
Int. Cl. H04n 9/12
U.S. Cl. 178—5.4         7 Claims

ABSTRACT OF THE DISCLOSURE

A light projection system that provides for the synthesis of multiple colored light beams whereby colored images can be projected for suitable visual display onto a viewing screen. The colored light beams are imaged by reflecting them off normally specular surface areas selectively provided with similar continuously changing non-specular images. A lens system in the path of each light beam provides an optimum arrangement for the projection components to minimize aberrations that occur as a result of angular projection. Such a lens system reduces angular projection by concentrating the light beam into a small area in front of the specular surface and then directing the light beam as a diverging cone onto the image-bearing reflective surface at a near normal angle. The reflected light beam is then directed at a similar near normal angle as a converging cone back into a concentrated area adjacent to the area of concentration of the direct light beam. The concentrated areas of the three reflected light beams are arranged closely together and they are similarly projected at a near normal angle onto a common image plane where the beams are integrated.

BACKGROUND OF THE INVENTION

A display system such as contemplated by the present invention may be utilized, for example, to visually track local air traffic. In one such system, radar and various other detecting media produce certain signals in response to the presence of a flying object. These signals are fed into a computer which determines such desired information as the location, height, etc., of the flying object. The computer then converts the information to an electronic code, and an appropriate signal is relayed to a cathode ray tube unit. The electronic beam of the cathode ray tube is caused to project a visual image representing the desired information onto the screen of the cathode ray tube. The image on the cathode ray tube is then projected by suitable means onto an enlarged viewing screen. A suitable means for projecting black and white images from such a cathode ray tube unit onto a viewing screen is disclosed in the commonly assigned U.S. patent application, Ser. No. 347,181, entitled Photochromic Display Using Cathode Ray Tube, filed in the name of Harley L. Bjelland.

In the system disclosed in the above application, the screen of a cathode ray tube is designed to specularly reflect light except in the areas struck by the electron beam of the cathode ray tube, which areas (forming the desired image) are rendered non-specular. A light beam is directed against the screen and is reflected thereby except in the non-specular image areas. The reflected beam is then projected onto a viewing screen where the areas that are illuminated by the light beam provide the white background for the black image areas that are not illuminated by the light beam.

Although a black and white display system has utility, there is a need for a display system that can project colored images. In the above-mentioned application, a color system is suggested that is essentially based on the system used for the black and white display system. Three separate colored light beams, e.g., blue, green and red, are respectively reflected off of three cathode ray tube screens. Programming of the three cathode ray tubes is synchronized so that the identical image can be simultaneously formed on any combination of the three cathode ray tube screens. The reflected colored light beams are combined, and projected onto a viewing screen with the images formed in the beams being superimposed. A proper balance of the intensity of the red, blue and green colored light beams will produce a white light and if all three cathode ray tube screens have been imaged, the image displayed on the viewing screen will be black. If the opaque image is formed on only two of the cathode ray tube screens, then the image formed on the viewing screen will take on the color of the beam reflected off of the non-imaged cathode ray tube screen. Thus, by selectively imaging various combinations of the three cathode ray tube screens, images can be projected onto the viewing screen in a variety of colors.

SUMMARY OF INVENTION

In a color projection system where the reflected light beams are independently projected from different angles onto a common image plane, the angular projection of each light beam will contribute to the production of aberrations in the projected image as it is finally displayed on the viewing screen. Thus, whereas a single light beam (such as in the black and white system) produces undesirable image aberrations, and cumulative effect of multiple colored light beams in the prior conventional projection systems can be intolerable. It is accordingly an object of the present invention to alleviate the aberrations such as produced by the above-mentioned combined angular projections of multiple light beams in a color display system.

In the preferred embodiment, the above is achieved by introducing an improved lens system into the path of each of the color light beams which minimizes the angles of light projection. A first lens of the lens system converges the light beam to concentrate the beam within a small area at a position adjacent to an imaginary line that is normal to the center of the respective light reflecting area of the cathode ray tube screen. A second lens located at said position receives the concentrated light and directs it as a diverging light beam toward said light reflecting area of the cathode ray tube screen at a near normal angle to the screen. The light beam is reflected by said reflective area of the screen at a similar near normal angle, and a third lens positioned adjacent said imaged area again converges the light beam to concentrate the reflected beam within a small area at a position adjacent to the normal and opposite to the small area of the concentrated direct light beam. A fourth lens at said position of concentrated reflective light receives the diverging conical light beam.

The fourth lenses of the three systems for the three colored light beams are coplanar and in close adjacency. The light beams are projected from said fourth lenses onto a common image plane where the three beams are integrated and the images carried thereby are superimposed. Because of the close confinement of said fourth lenses, similarly minimal angular projection of the three beams onto the image plane is achieved resulting in a minimum of optical aberration in the final image displayed on the viewing screen.

The invention as generally described above achieves the desired optical results while providing for an inexpensive and compact assembly of components. These and other advantages of the present invention will become obvious from the following detailed description and drawings wherein:

FIG. 1 is a perspective view illustrating a color display apparatus in accordance with the invention;

FIG. 2 is a perspective view illustrating the system employed by the apparatus of FIG. 1;

FIG. 3 is a cross-sectional view of a cathode ray tube utilized in the system of FIG. 2;

Figure 5:
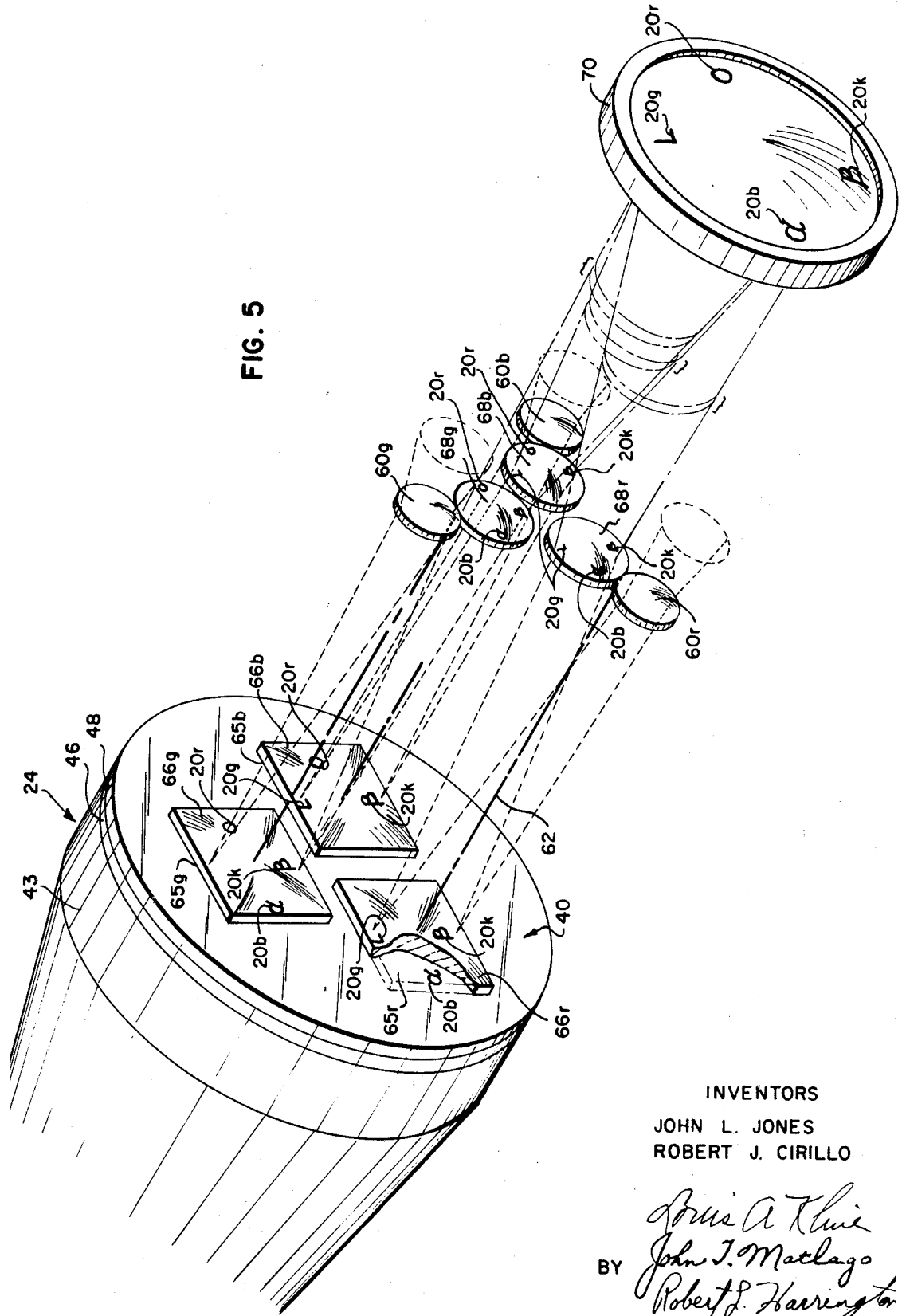

FIG. 5 schematically illustrates a part of the system of FIG. 2, showing the multiple beams being reflected off of the specular surface of the cathode ray tube screen; and FIG. 6 is a simple block diagram schematically illustrating the electronics controlling the cathode ray tube beam.

With reference to FIG. 1 of the drawings, a display apparatus 10 projects an imaged light beam 12 onto a viewing screen 14 to produce thereon an image 16. The image is comprised of a reference portion 18 and object portions 20.

It will be noted that the specific designation of each of the object portions 20 includes a lower case letter, i.e., $r$, $g$, $b$ and $k$. These lower case letters designate color. Letter $r$ designates the color red, letter $g$ designates green, letter $b$ designates blue and letter $k$ designates black. Hereafter, when reference is made to object portion 20 without an associated lower case letter, it will be understood that the object portions 20$r$, 20$g$, 20$b$ and 20$k$ (respectively illustrated as characters O, L, $\alpha$ and $\beta$) are referred to collectively. This same procedure is followed throughout the case. Thus, whereas the projection system for each light beam of the described embodiment is the same, when referring collectively to the same component of all three systems the letters designating color will generally be omitted and when referring to a component of a specific light beam, the letter will be used.

In the illustrated system, the reference portion of the projected image represents a stationary map of the United States. The object portions 20 represent unidentified aircraft that have been detected by various detecting equipment, e.g., radar, etc. The signals generated by the detecting equipment are sent to a computer. In response to the signals, the computer computes such information concerning the aircraft as speed, height, etc. This information is then sent as an electronic code to the display apparatus 10, and more specifically to a cathode ray tube unit 24 embodied within the apparatus.

The detecting system including the electronics integrated therewith, is well known in the art and is accordingly not shown or described herein. Furthermore, the electronics for controlling the cathode ray tube to project a visual image on the screen of the cathode ray tube in response to a computer signal is within the skill of the art. A general disclosure will be helpful and is set forth in the simple block diagram of FIG. 6, which is explained by way of reference to the following example.

EXAMPLE OF ELECTRONIC SYSTEM

The display input data equipment 80 may comprise, for instance, a computer having the capability of converting the information of the detecting equipment (not shown) into three sets of signals—character selection signals, color selection signals and position selection signals. As an example, the information to be displayed may be that a flying object detected by the detecting equipment is an unidentified aircraft located at a position represented by the coordinates $x5$, $y14$ on an established $x$–$y$ axis, flying at a height of 30,000 feet. The display input data equipment 80 will thus provide character selection signals designating the character $\alpha$ (indicating the 30,000 foot height), and color selection signals designating a blue image (indicating that the aircraft is unidentified), and position selection signals designating coordinates $x5$, $y14$ (indicating the particular location of the aircraft).

The operational sequence of the display input data equipment 80 is to first provide position selection signals $x_r$ and $y_r$ which are respectively applied to $x$ control 86 and $y$ control 88 to cause the CRT beam to be positioned at coordinates $x5$, $y14$ on the area 65$r$ of screen 90 (that area against which the red light beam is reflected). The display input data equipment then provides character selection signals which cause the character generator 82 to provide signals to the $x$, $y$ and $z$ controls so as to write the character $\alpha$ at the $x5$, $y14$ coordinate position of the area 65$r$ of the screen 90. (The grid lines and coordinates are shown on the illustrated CRT face plate of FIG. 6 for exemplary purposes and may not be actually visible as noted from FIG. 5.) As described heretofore, to project a blue image, a character is written in the areas reflecting the red and green light beams and not in the area reflecting the blue light beam. Thus, during the operation of character generator 82 in writing on the area 65$r$, the display input data equipment provides color control signals which are applied to the $z$ control 84 to permit the cathode ray tube beam to write the selected character $\alpha$ in the selected position $x5$, $y14$ on the area 65$r$.

The display input data equipment next provides position selection signals $x_b$ and $y_b$ which cause the beam to be positioned at the $x5$, $y14$ coordinate position of the area 65$b$ (that area reflecting the blue light beam). The character generator then again writes the character $\alpha$ at the new position, but this time the color control signals provided by the display input data equipment 80 prevents the character from being written in the area 65$b$. (Note that the character $\alpha$ is shown in the area 65$b$ as a dotted line indicating that it is not visually projected in that area.)

The display input data equipment next provides position selection signals $x_g$ and $y_g$ which cause the CRT beam to be positioned at coordinates $x5$, $y14$ of the area 65$g$ (that area reflecting the green light beam). The character generator 82 is again signaled to write the character $\alpha$ at the new selected position and, as for the area 65$r$, the display input data equipment provides color control signals which permit such writing of the selected character $\alpha$ at the selected position $x5$, $y14$ of the area 65$g$.

The character $\alpha$ is thus written in identical coordinate areas of the areas 65$r$ and 65$g$ but not in the area 65$b$. Accordingly, when the light beams are reflected off the screen, as described in other sections herein, the $\alpha$ image appears as a blue image on the viewing screen.

THE CATHODE RAY TUBE

A suitable screen for the cathode ray tube (illustrated in FIG. 3) is of the type disclosed in the abovementioned Bjelland application. Briefly, the cathode ray tube includes a face plate 40 that is made of parallelly disposed optical fibers 42. The fibers 42 are bonded to each other to form a fiber optic plate 43. To provide a non-distorted flat image field on the outside surface of the fiber optic face plate, the inside surface is made spherically concave and the outside surface is made flat. The inside concave surface of the fiber optic face plate is coated with a phosphor 44 having the property of producing ultraviolet light. The outside surface of the fiber optic face plate is coated with a thin dichroic filter 46 having the properties of transmitting ultraviolet light and of reflecting visible light. A photochromic film 48 is placed next to the dichoic filter 46. When the high energy electron beam in the cathode ray tube bombards the phosphor 44, ultraviolet light is emitted from a small spot of the phosphor. The fiber optic face plate relays the spot source of ultraviolet light to the outside surface. Since the dichroic filter 46 passes ultraviolet light, an opaque spot is written on the photochromic film 48. A visible opaque pattern is immediately produced on the photochromic film 48 with little or no loss in resolution. Because the photochromic material as used in the film has persistence or temporary memory, the pattern represents only the latest information.

THE PROJECTION SYSTEM

Figure 4:
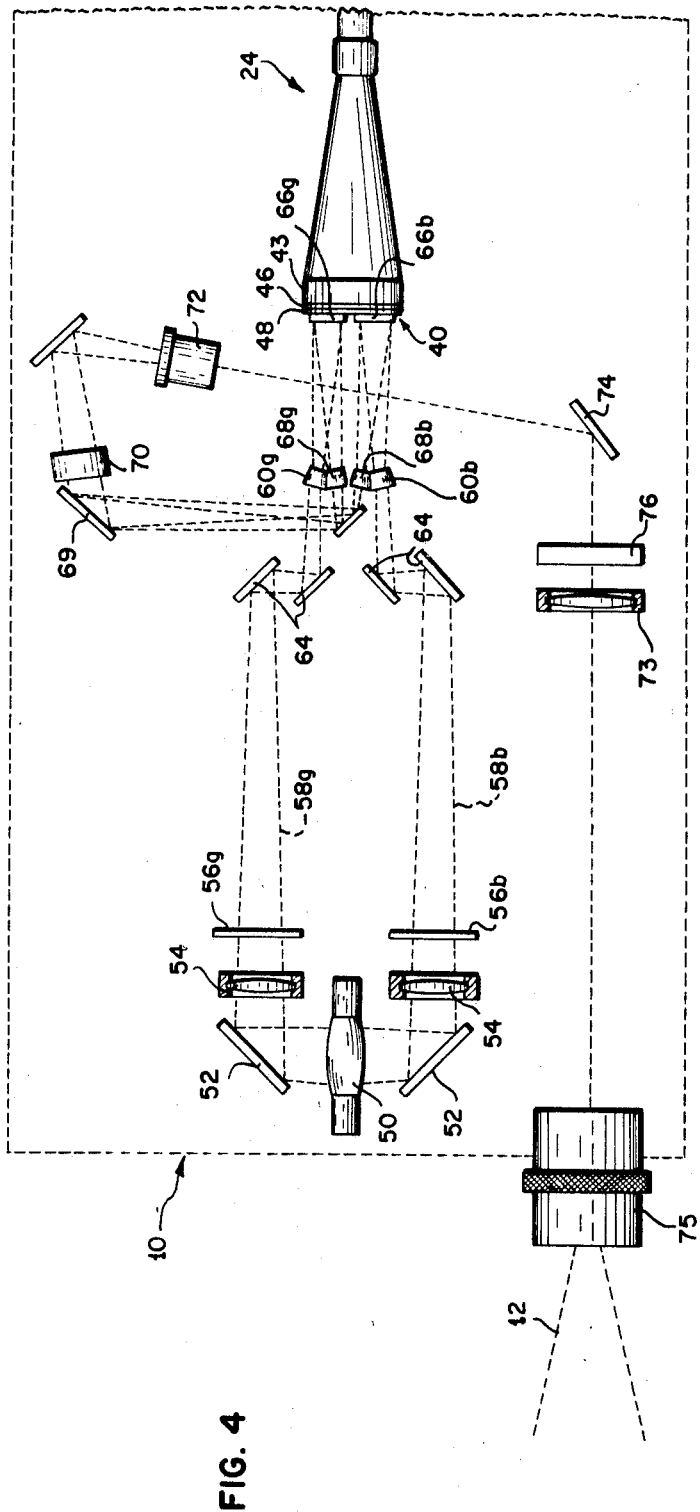
FIG. 4 is a side view illustrating two of the light beams being projected through the system of FIG. 2.

Referring to FIGS. 2 and 4, a light source 50, e.g., a xenon lamp, is mounted in the forward end of the apparatus 10 (outlined in FIG. 4). Three mirrors 52 are stationed around the light source 50 to reflect three separate light beams from the light source through three condensing lenses 54. Each condensing lens gathers the light being directed toward it from a mirror 52 and directs it as a converging conical light beam respectively through filters 56r (red filter), 56g (green filter), and 56b (blue filter). Filter 56r is transparent only to red light and thus transmits a red converging conical light beam 58r (see FIG. 2), a second filter 56g is transparent only to green light and thus transmits a green converging conical light beam 58g, and the third filter 56b is transparent only to blue light and thus transmits a blue converging conical light beam 58b.

Each of the three light beams is respectively directed toward a diverging lens 60. As shown most clearly in FIG. 5, each of the three diverging lenses 60 is respectively positioned adjacent an imaginary line of normal 62 to the center of the respective image area of the cathode ray tube screen.

The screen of the cathode ray tube is kept small, e.g., a screen size with a diameter of about three inches, to minimize the cost of the system. Another consideration is the packaging dimensions and thus to facilitate the confinement of the light projecting means for the three conical light beams while providing for said light beams to be properly directed through the lens 60 onto the three image areas of the screen, a pair of mirrors 64 are positioned in each light beam at a point intermediate of filter 56 and lens 60 (where the cross-section of the beam is substantially reduced) to shift the beams into alignment with said image areas.

As shown in FIG. 5, the light beams are directed by the lens 60 as a diverging conical light beam toward the image areas 65 of the cathode ray tube screen. A converging lens 66 is positioned against the face of the cathode ray tube screen over each of the image areas 65. Note that the lens is shown as being rectangular rather then circular to permit a closer relative spacing of the image areas. The light beam, upon being reflected off the specular surface of the screen, is directed by converging lens 66 toward a second diverging lens 68 that is positioned adjacent on the line of normal 62 coplanar with and opposite the first diverging lens 60.

The object portions 20 of image 16 are provided on the image areas 65 of the cathode ray tube face plate 40, in the manner previously described, by rendering such portions non-reflective. Accordingly, the red light beam 58r reflected off image area 65r is dark in the portions of the beam striking the non-reflective object areas 20g (to be displayed as a green image), 20b (to be displayed as a blue image), and 20k (to be displayed as a black image). The green light beam reflected off image area 65g is dark in the portions of the beam striking the non-reflective areas 20b, 20k and 20r, and the blue light beam reflected off image area 65b is dark in the portions of the beam striking the non-reflective areas 20k, 20g and 20r. The dark areas for each light beam are formed at the respective diverging lenses 68r, 68b and 68g as noted in FIG. 5.

The three diverging lenses 68r, 68b and 68g then direct the respective light beams through reflecting mirrors 69 (shown in FIGS. 2 and 4, but omitted in FIG. 5) toward a common lens 70. The imaged portions 20g, 20b, 20r and 20k of the three light beams are superimposed at said lens 70 (shown in FIG. 5). The three colored light beams combine to make up a white light except in the image portions 20r, 20b, 20g and 20k. Because the red light beam is imaged with image portions 20g, 20b, and 20k, and not with 20r, and because both the blue and green light beams are imaged with image portion 20r, said image portion 20r is exposed to the red light only and appears as a red image against a white background. For the same reason, image portion 20b appears as a blue image, and image portion 20g appears as a green image at lens 70. All three light beams are imaged with image portion 20k and accordingly it appears as a black image at the lens 70. The combined image formed at the lens 70 is projected by a projection lens system which includes the various lens components 72, 73 and 75 and reflective mirrors 74 onto the viewing screen 14 (shown in FIG. 1).

The reference or background image 18 can be introduced into the display system in any of a number of ways. For example, as shown in FIGS. 2 and 4, the reference image 18 can be contained on a transparency 76 and introduced at an image plane adjacent a lens 73 within the projection lens system.

It has been found that using the mentioned xenon lamp as a light source rather than, for example, a tungsten lamp, provides certain desirable results. The xenon lamp provides the necessary spectral continuum to provide full color rendition, but of more importance, it has a much higher intrinsic luminance than such other types of lamps. For a given required screen luminance, this higher source luminance enables the use of smaller lenses 60 and 68 which further reduces the off axis angle of the optical system.

A further consideration in designing the present optical system concerns the type of lenses used as lenses 60 and 68 of the optical system. The requirements for these lenses are rather stringent in that each lens should, over the exact same object to image distance, form exactly the same size image with the same distortion characteristic (that is, all points in each of the three projected images should exactly overlay each other). Lenses that satisfy these requirements are difficult to manufacture. Thus, it is desirable to use lenses with adjustable focal lengths, referred to as "cluster lenses."

What is claimed is:

1. An optical information color display system comprising means for providing a plurality of colored light beams, a similar number of reflective screen areas having surfaces that are normally specular to the light of the colored light beams, means for selectively rendering identical areas of any of the normally specular surfaces non-specular to the colored light beams, and optical means to direct each light beam against one of said reflective screen areas and to combine the reflected portions of the light beams at a common image plane where said non-reflected portions of the light beams are superimposed, and projection means for projecting the combined light beams onto a viewing screen; said optical means including the improvement whereby a plurality of lens means are provided to independently direct each of the plurality of light beams from different angular positions onto the common image plane with a minimum of angular aberrations.

2. An optical information display system comprising means for providing a plurality of light beams, a reflective screen having a surface that is normally specular to the light of said light beams, means for rendering selective areas of said surface non-specular to the light of said light beams, and a plurality of optical means for directing said light beams against said specular surface and for directing the reflected portion of said light beams onto a viewing screen where said non-specular areas of the reflective screen are visually reproduced; each of said optical means including the improvement comprising a first condensing lens stationed in the path of one of the light beams to direct the light thereof as a converging conical light beam for condensing the light of the light beam into a small area at a position spaced from the reflective screen and substantially adjacent an imaginary line of normal from the center of the normally specular surface, a first relay lens stationed at said position adjacent the line of normal to receive the condensed light beam and to direct the light as a diverging conical light beam at a near normal angle toward the normally specular surface, a second condensing lens overlying said normally specular surface for directing the reflected light as a converging conical light beam for condensing the light into a small area at a position substantially adjacent to the line of normal and spaced from the reflective screen similar to the spacing for the condensed area of the direct light beam, and a second relay lens stationed at said position to receive the condensed reflected light beam and to direct the light thereof as a diverging conical light beam through a projection means onto the viewing screen.

3. An optical information display system as defined in claim 2 wherein said reflective surface is comprised of a screen forming the face plate of a cathode ray tube, said face plate having its inside surface coated with a phosphor having the property of producing ultraviolet light when bombarded with the electron beam of said tube, a dichroic filter disposed on the outside surface of said face plate having the property of transmitting ultraviolet light and of reflecting visible light, a normally transparent photochromic film disposed over the dichroic filter having the property of being rendered opaque in response to ultraviolet light, and means controlling the beam of said cathode ray tube to bombard the phosphor coating in a desired pattern whereby ultraviolet light is emitted from said bombarded areas of the phosphor through the face plate and dichroic filter onto the photochromic film to render areas of the photochromic film corresponding to said pattern opaque.

4. An optical information color display system comprising means for providing a plurality of colored light beams, a similar number of reflective screen areas having surfaces that are normally specular to the light of the colored light beams, means for selectively rendering identical areas of any of the normally specular surfaces non-specular to the colored light beams, and optical means to direct each light beam against one of said reflective screen areas and to combine the reflected portions of the light beams at a common image plane where said non-reflected portions of the light beams are superimposed, and projection means for projecting the combined light beams onto a viewing screen; said optical means including the improvement whereby a first condensing lens is stationed in the path of each colored light beam to direct the light thereof as a converging conical light beam for condensing the light of the light beam into a small area at a position spaced from the respective reflective screen area and substantially adjacent an imaginary line of normal from the center of the normally specular surface of the reflective screen area, a first relay lens stationed at said position adjacent the line of normal to receive the condensed light beam and to direct the light as a diverging conical light beam at a near normal angle toward the normally specular surface of said reflective screen area, a second condensing lens overlying said normally specular surface for directing the reflected light at a near normal angle as a converging conical light beam for condensing the light into a small area at a position substantially adjacent to the line of normal and spaced from the reflective screen area similar to the spacing for the condensed area of the direct light beam, and a second relay lens stationed at said position to receive the condensed reflected light beam and to direct the light thereof as a diverging conical light beam at a near normal angle to said common image plane.

5. An optical information color display system as defined in claim 4 wherein said reflective screen areas are formed on the face plate of a single cathode ray tube, said face plate having its inside surface coated with a phosphor having the property of producing ultraviolet light when bombarded with the electron beam of said tube, a dichroic filter disposed on the outside surface of said face plate having the property of transmitting ultraviolet light and of reflecting visible light, a photochromic film disposed over the dichroic filter having the property of being rendered opaque in response to ultraviolet light, and means controlling the beam of said cathode ray tube to bombard the phosphor coating in a similar pattern in selected ones of said reflective screen areas whereby ultraviolet light is emitted from said bombarded areas of the phosphor through the face plate and dichroic filter onto the photochromic film to render areas of the photochromic film corresponding to said pattern opaque.

6. An optical information color display system as defined in claim 5 wherein the means for providing a plurality of colored light beams comprises a single light source, three mirrors are positioned around the light source to reflect light from the light source for providing three separate light beams, said first condensing lens for each of the three light beams positioned adjacent each of said three mirrors, and a light filter positioned in each light beam to filter out all light except red light for one light beam, blue light for a second light beam and green light for the third light beam, said light beams being provided with a balance of light intensity for making a white light when combined on the common image plane.

7. A projection apparatus for light projecting images onto a viewing screen comprising a housing, a cathode ray tube mounted in the housing, a light source mounted in the housing and means for providing three separate light beams directed away from the light source, color filters placed in the path of the light beams to filter out all but green light from one light beam, all but blue light from a second light beam, and all but red light from the third light beam, a lens system for each light beam to direct each light beam against three separate areas of the face plate of the cathode ray tube, said face plate having a surface that is normally specular to the light beams and which surface becomes decayably non-specular when struck by utlraviolet light, means for impinging descriminate portions of the normally specular surface with ultraviolet light in response to the electron beam of the cathode ray tube whereby similar nonspecular images are formed on any of the three light struck areas, and said lens system combining the light beams at a common image plane where the images are superimposed, and a projection lens mounted in the wall of the housing for projecting the image formed by the combined light beams from the housing onto a viewing screen, said lens system comprising the improvement whereby said lens system comprises a first condensing lens stationed in the path of each colored light beam to direct the light thereof as a converging conical light beam for condensing the light of the light beam into a small area at a position spaced from the respective reflective screen area and substantially adjacent an imaginary line of normal from the center of the normally specular surface of the reflective screen area, a first relay lens stationed at said position adjacent the line of normal to receive the condensed light beam and to direct the light as a diverging conical light beam at a near normal angle toward the normally specular surface of said reflective screen area, a second condensing lens overlying said normally specular surface for directing the reflected light at a near normal angle as a converging conical light beam for condensing the light into a small area at a position substantially adjacent to the line of normal and spaced from the reflective screen area similar to the spacing for the condensed area of the direct light beam, and a second relay lens stationed at said position to receive the condensed reflected light beam and to direct the light thereof as a diverging conical light beam at a near normal angle to said common image plane.

References Cited
UNITED STATES PATENTS

| | | | |
|---|---|---|---|
| 2,600,590 | 6/1952 | Thomas | 178—5.4 XR |
| 2,681,380 | 6/1954 | Orthuber | 178—5.4 |
| 3,258,525 | 6/1966 | Piatt et al. | 178—5.4 |

ROBERT L. GRIFFIN, Primary Examiner

R. MURRAY, Assistant Examiner